United States Patent [19]

Hauck, Jr.

[11] Patent Number: 5,245,563
[45] Date of Patent: Sep. 14, 1993

[54] FAST CONTROL FOR ROUND UNIT

[75] Inventor: Charles E. Hauck, Jr., Framingham, Mass.

[73] Assignee: Kendall Square Research Corporation, Waltham, Mass.

[21] Appl. No.: 763,127

[22] Filed: Sep. 20, 1991

[51] Int. Cl.[5] .............................................. G06F 7/38
[52] U.S. Cl. ...................... 364/745; 364/748
[58] Field of Search ............... 364/745, 715.09, 748, 364/769

[56] References Cited

U.S. PATENT DOCUMENTS

| | | | |
|---|---|---|---|
| 4,589,084 | 5/1986 | Fling et al. | 364/745 |
| 4,589,087 | 5/1986 | Auslander et al. | 364/736.5 |
| 4,924,422 | 5/1990 | Vassiliadis et al. | 364/715.09 |
| 5,020,016 | 5/1991 | Nakano et al. | 364/736.5 |
| 5,055,999 | 10/1991 | Frank et al. | 364/200 |
| 5,119,481 | 6/1992 | Frank et al. | 395/325 |

FOREIGN PATENT DOCUMENTS

| | | |
|---|---|---|
| 88311138.7 | 6/1988 | European Pat. Off. |
| 88311139.5 | 7/1988 | European Pat. Off. |
| 90306776.7 | 12/1990 | European Pat. Off. |
| 90306777.5 | 12/1990 | European Pat. Off. |

OTHER PUBLICATIONS

Mark R. Santoro et al., "Rounding Algorithms For IEEE Multipliers", Stanford University.

Primary Examiner—Long T. Nguyen
Attorney, Agent, or Firm—Lahive & Cockfield

[57] ABSTRACT

A method and processor for evaluating numbers processes components of a pair of input numbers A, B in a plurality of identical gate structures. Each gate structure receives information from two bit positions and operates without carry information or any earlier computations to produce a conditional sum word. A control signal derived from the conditional sum word provides the same evaluation as the actual sum in fewer processing steps. A preferred embodiment produces the sticky bit for a rounding off unit in a floating point processor.

8 Claims, 4 Drawing Sheets

FAST CONTROL FOR ROUND UNIT

BACKGROUND

This invention relates to the high speed performance of numerical calculations, and in particular to hardware and methods of efficiently implementing numerical operations in digital processing devices.

In the design of digital processing apparatus, operations calling for arithmetical operations on numbers pose special problems. Even an elementary binary operation such as multiplication can require a great number of steps for its implementation. For this reason, multiplication, for example, is usually carried out by special hardware units, such as a floating point processing chip that receives two n-bit input numbers, and provides a number of output words that in turn are combined to yield the n most significant bits of the product of the two numbers. Such chips generally split the arithmetical operation into a number of simpler operations on components of the input numbers, and combine the results of these simpler operations, thus operating in parallel to arrive at an output in fewer levels of computation, or in less time.

In the case of a floating point n-bit multiplier, the product of two n-bit numbers containing 2n bits, is output as an n-bit number, entailing the sacrifice of information contained in the lesser bits. In order to control the propagation of errors when many arithmetical operations are performed in succession, the lesser bits must be inspected and some form of rounding-off operation performed.

To maintain consistency among floating-point coprocessors, the IEEE/ANSI has promulgated Standard 754 for binary floating-point arithmetic operations and rounding-off of computed values. The default rounding mode of this Standard requires that the n-bit representation nearest to the infinitely precise result shall be delivered; if the two nearest values are equally near, then the one with its least significant bit equal to zero shall be delivered. This is a "nearest/even" rounding off rule. Several other optional rounding modes are also specified in the Standard.

In practice, this Standard is implemented by inspecting the least significant bits of a calculation and determining whether a given rounding mode requires truncating, shifting, addition of one bit, or the like. The least significant bits are inspected and a control signal based on their content is generated to control the rounding off operation, so that the rounding off algorithms need only be invoked for words meeting a threshold value of significance.

One common control signal, the so-called sticky bit, is defined by 0 if all bits to the right of the sticky=least significant bit are zero, and
1 otherwise where "least significant bit" is here used to mean the least of the n most significant bits, or the rounding off bit position.

Computationally this sticky bit is determined by a carry propagate addition on all the less significant bits of the units LSB output words to obtain their sum, followed by a logical OR of all bits to the right of the rounding-off position in the LSB sum. However, the degree of processing required to form the necessary addition entails rather large-area circuit elements and a large number of sequential steps. For example an n-bit adder requires at least $\log_2(n)$ successive steps for its processing.

Accordingly it is desirable to determine control signals of this sort in a more efficient fashion.

SUMMARY OF THE INVENTION

A control signal according to the present invention is determined by separately combining component bits of pair of n-bit words in n identical gate units, and forming an n-bit control word of the gate unit outputs. In one embodiment for controlling the operation of a rounding off unit in a floating point processor, the n-bit control word is then evaluated like a conventional sum to define a sticky bit having values identical to the sticky bit of a conventional sum. In a preferred embodiment each gate unit includes a pair of first gates, the two outputs of which are the inputs to a second gate. The second gate provides a single bit output, and all the first and second gate units operate in parallel during first and second time intervals, so that the entire control word is produced in two steps independently of the length n. In a system employing the control word processor according to this invention, the input words may be the n-bit least significant bit output words of a carry-save array multiplier, and the resultant control word components are ORed to form a 1-bit control signal that is passed to a rounding-off processor to shift, increment or truncate the MSB output of the multiplier accordingly.

BRIEF DESCRIPTION OF DRAWINGS

These and other features of the invention will be understood by reference to the following description and illustrative drawings, wherein.

DETAILED DESCRIPTION

Figure 1:
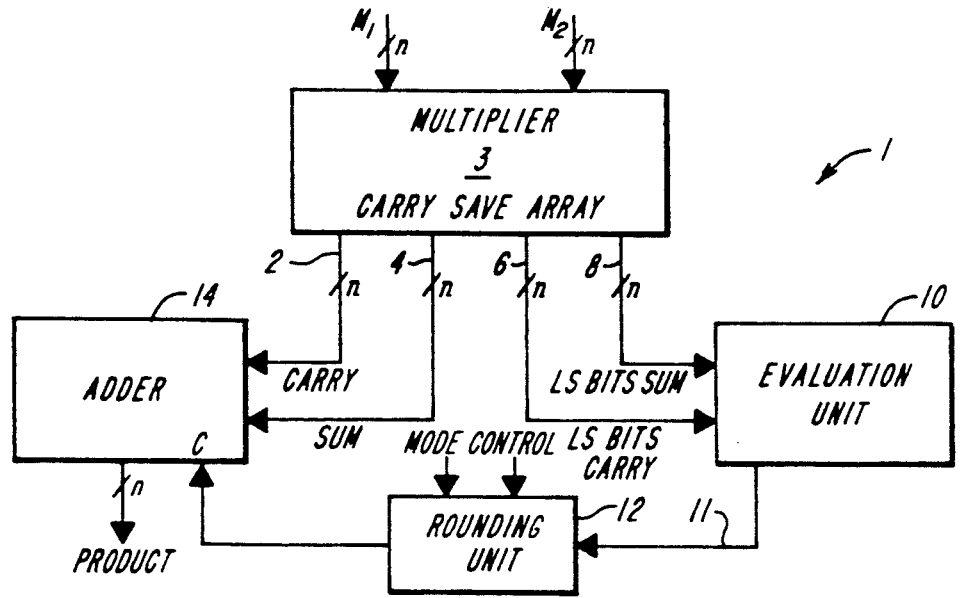
FIG. 1 illustrates a prior art floating point processor.

By way of presenting a context for illustrating a particular implementation of the present invention, FIG. 1 shows a representative prior art arithmetical multiplier unit 1 in which a dedicated chip 3 operates on a pair of n-bit input numbers $M_1$, $M_2$ to produce n-bit CARRY and SUM words at outputs 2, 4 constituting the n most significant bits of the calculated 2n-bit word product, and separate outputs 6, 8 that deliver the n least significant bits of the CARRY and SUM results.

The CARRY and SUM outputs 2, 4 are fed to an adder 14, while the LSB outputs 6, 8 are fed to an evaluation unit 10. Unit 10 inspects the lesser bits to determine whether they can be ignored or whether they require an adjustment of the output determined solely from the outputs 2, 4. The output of evaluation unit 10 passes as a control output on output line 11 to a rounding unit 12. Unit 12 implements a rounding off algorithm, such as specified in IEEE Standard 754.

Figure 2:
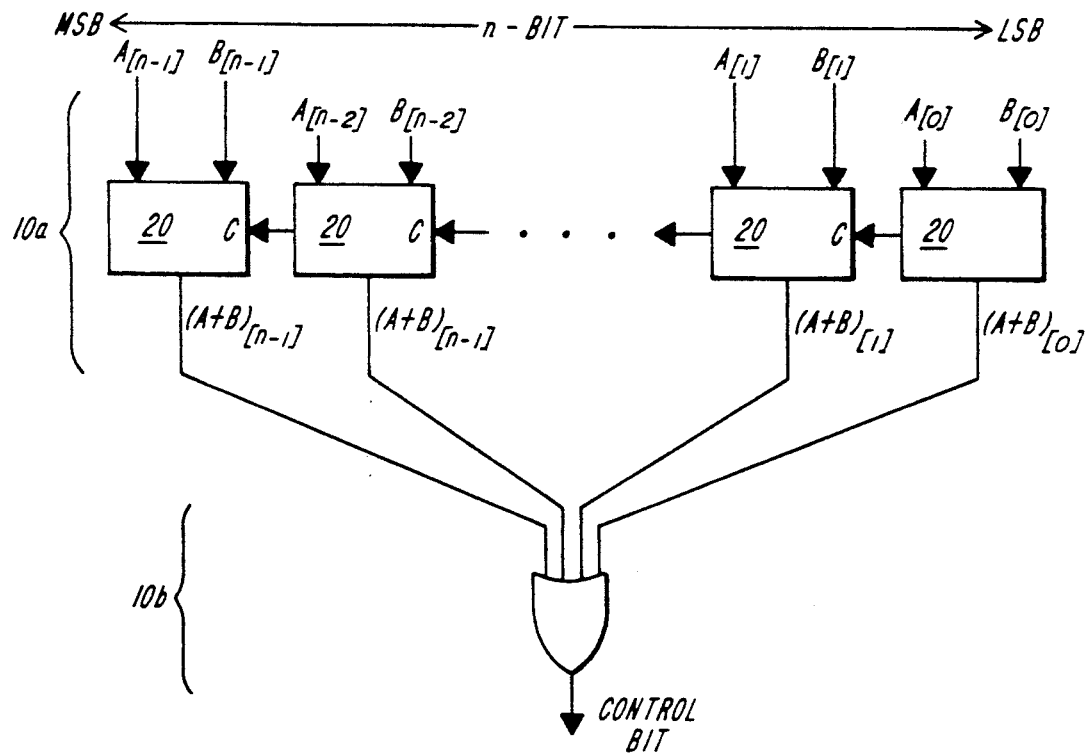
FIG. 2 illustrates a prior art circuit for determining information content of lesser bit positions in the output.

FIG. 2 shows a representative evaluation unit 10 of the prior art. This unit adds the n least significant bit CARRY and SUM words A, B together to produce their arithmetical sum A+B, having the components $(A+B)_{[i]}$. It then ORs these components to determine whether there are any non-zero components to the right of the n most significant bits, i.e. any non-zero components in the sum.

An n-bit adder $10a$ performs the addition, while an n-bit OR gate unit $10b$ operates on the adder output. As shown, adder $10a$ is implemented as a chain of basic adder cells $20_0, \ldots 20_{n-1}$. Each basic cell $20_i$ receives as inputs the bit components $A_i$, $B_i$, and a carry input from the preceeding adder cell $20_{i-1}$. Because of this dependence on an earlier carry result, the operation of the adder requires that the cells be operated in n successive time slots to accurately produce the sum $(A+B)$.

In implementing such a device, the fabrication of a full n-bit adder requires a relatively large chip area, and the need for many processing steps after operation of the multiplier 3 further limits the device speed. It is possible to implement the adder differently, reducing the required number of steps to $\log_2(n)$. Alternatively, certain quick checking algorithms, such as counting zeros in the lesser bits of operands $M_1$ and $M_2$, may be used to entirely remove the evaluation step from the critical path for some limited range of input values.

A circuit and method according to the present invention takes a different approach, and implements a numerical evaluation unit for producing a control word by passing components of a pair of input words to a plurality of multi-gate units that operate in parallel to produce an output word S which applicant refers to as a conditional sum. The multi-gate units operate in two steps, and each receives input values from two adjacent bit positions of the pair of input words, so the control word S is formed in a short time, and without requiring carry values from lesser bit positions. The gate logic extracts information at each bit position of the input words, so that the conditional sum will produce the same evaluation or control signal as the true sum for controlling a rounding-off stage of an arithmetical chip.

Figure 3:
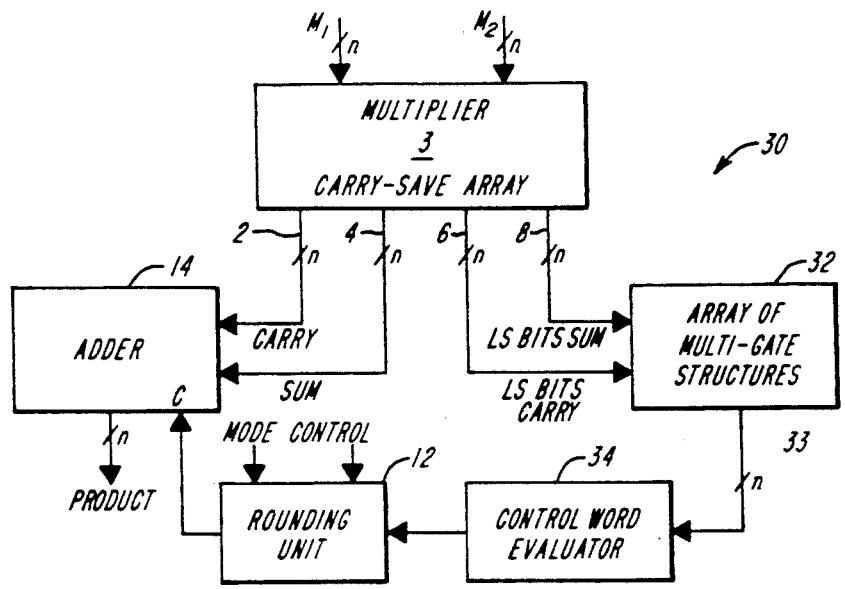
FIG. 3 illustrates in schema the present invention incorporated into a processor like that of FIG. 1.
Figure 3A:
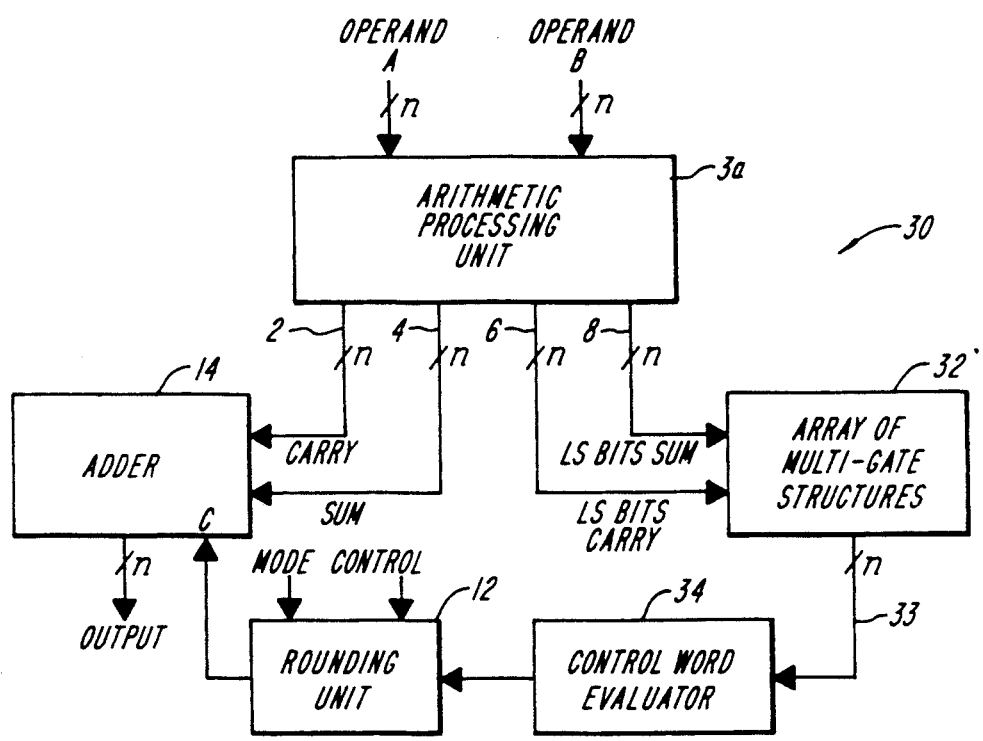
FIG. 3A illustrates another embodiment.

As shown in FIG. 3, a multiplication unit 30 similar to that of FIG. 1 but further incorporating the present invention, replaces the evaluation unit 10 with a pair or processing structures 32, 34. Processing structure 32 is an array of multi-gate structures that operate directly on the lesser bit output words from multiplier 3 to produce a control word S on line 33. The other structure is a control word evaluator 34 that provides a direct control signal to the rounding unit 12. The invention contemplates an arithmetic processing unit $3a$ (FIG. 3A) such as a floating point unit, preferably an adder, divider or multiplier, operating on pairs of operands A, B to produce an output.

As described in more detail below, each multi-gate structure of the array 32 is identical, and each receives information from two adjacent bit positions of the input words. The structures operate in parallel without relying on prior calculation of carry bits, to produce a pseudo-sum or "conditional sum" of the input words in only two steps.

Figure 4:
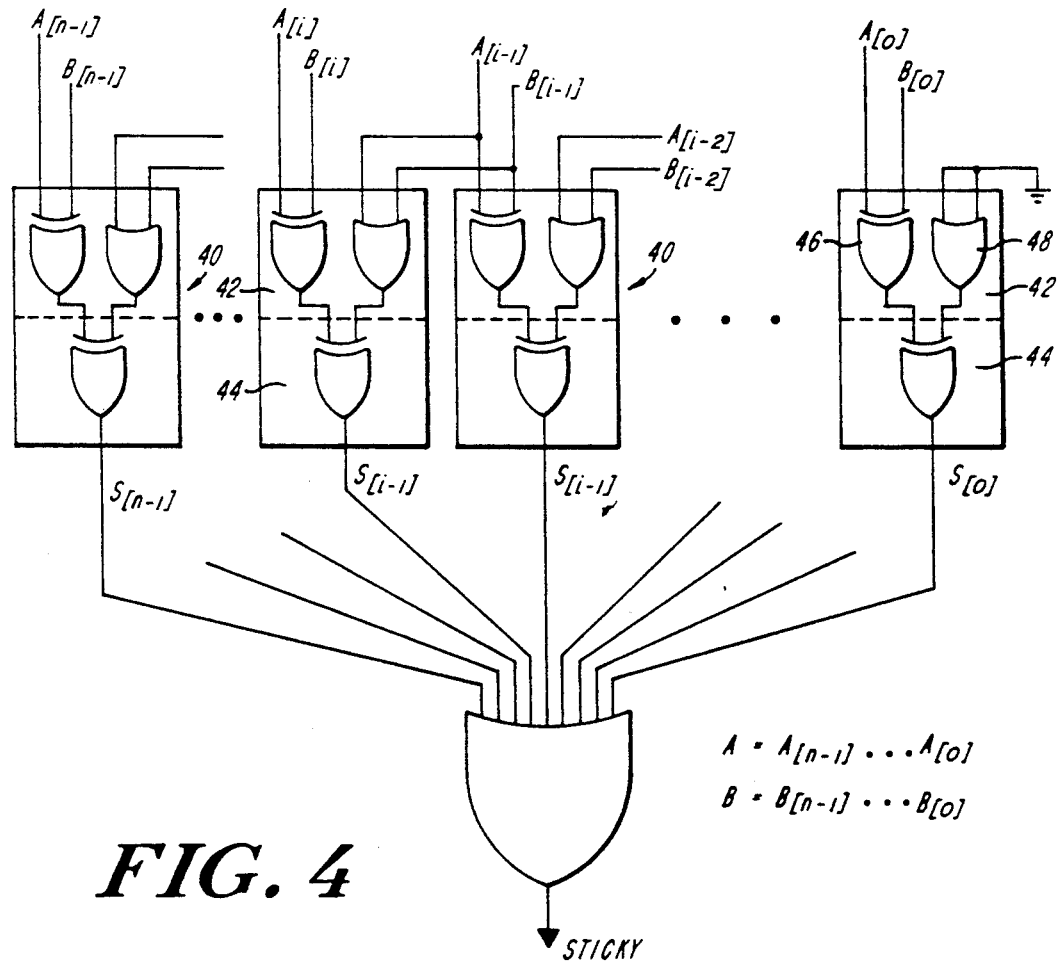
FIG. 4 shows details of control word generation in accordance with the present invention.

FIG. 4 shows the implementation of the array 32 of multi-gate structures and the control word evaluator 34 on a circuit or logic element level. For purposes of illustration, the input words are denoted simply A, B, with components $A_{[n-1]} \ldots A_{[0]}$ and $B_{[n-1]} \ldots B_{[0]}$ respectively.

Each structure 40 of the array includes two ranks of gates, a first rank 42 of gates that provide an input to a second rank 44, and a rank 44 that produces an output bit, so that only two time slots are required for generation of the control word S.

As shown, during a first operating period or time slot, the $i^{th}$ structure 40 XORs the $i^{th}$ components of input words A, B in XOR gate 46, and ORs the $(i-1)^{st}$ components in OR gate 48 the two gates being in a rank 42 that operates in parallel. It then XORs the outputs of these two gates in rank 44, consisting of a single XOR gate that operates in a later time slot. Intuitively, a "1" in the $i^{th}$ output bit $S_{[i]}$ may be understood as occurring if there is either a "1" in the output of gate 46 (meaning the sum of $A_{[i]} + B_{[i]}, = 1$), or a "1" in the output of gate 48 (indicating that the sum of the $[i-1]$ components is either "1" or results in carrying 1 into the $i^{th}$ component), but not both.

As illustrated, the array 32 is shown to have n such multi-gate structures 40, that is, the same number of identical units 40 as there are bits to be evaluated in the sum of words A and B. However, it will be seen that the logical operations defined by each gate structure extract information from each bit position that, while each dependent on the next lesser bit, are independent both of higher bit positions and of carry values. The number of units 40 may be chosen to be less than n; that is, a smaller number m, when it is desired to evaluate only the m least bits, as may occur, for example, in an arithmetical unit with an architecture that collects ranked cross-terms of an arithmetical product formed by expansion. Thus, although illustrated herein with the example of a control unit that processes the n-bit words from an n-bit multiplier carry-sum array, in general the invention will be understood to apply to an array of $m \leq n$ gate structures for any value m wherein it is desired to evaluate the content of m least significant bits of a sum occurring in an arithmetical processing unit.

Figure 5:
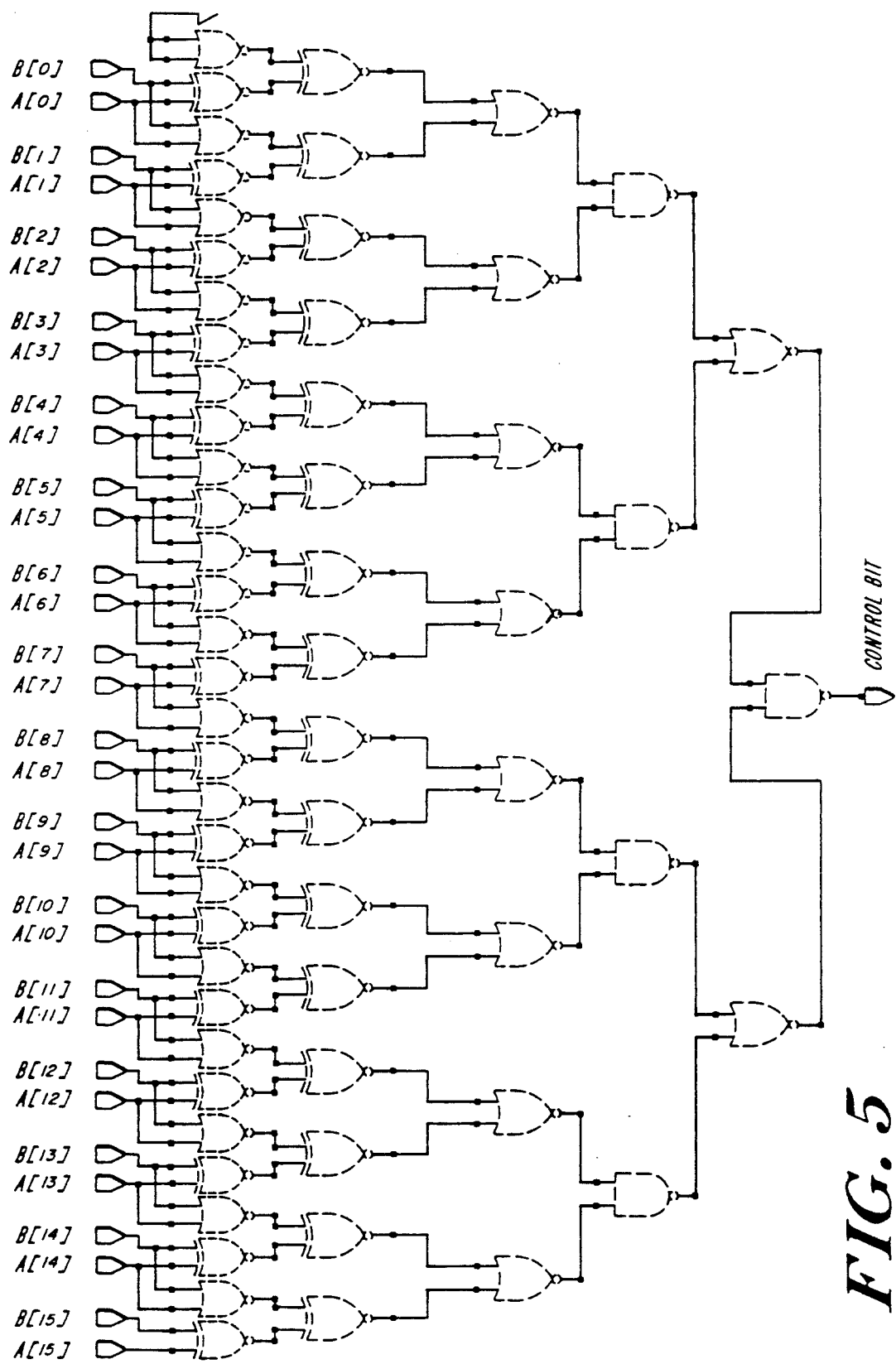
FIG. 5 shows a full circuit for generation of a control signal according to the present invention.

FIG. 5 illustrates in greater detail the implementation of a sixteen bit array 32 and control word evaluator 34 such as illustrated in FIGS. 3 and 4. The evaluator receives as its inputs the bit values $S_{[15]} S_{[14]} \ldots S_{[0]}$ of a 16-bit word S, each successive pair being applied to one of eight NOR gates 51. The outputs of these NOR gates are applied to a second rank of four NAND gates, which in turn apply their outputs to a rank of two NOR gates, the outputs of which are NAND'd to produce a one-bit control output in which the active value is chosen to reflect the n-bit OR of the input values. This effectively implements an n-bit OR gate, as described. Implementation with other configurations of gates is also possible, as will be readily understood by those skilled in the art.

It will be appreciated that the foregoing description of a control word generator for evaluating the information content of the less significant bits of digital words has been illustrated in an exemplary embodiment for ease of understanding, but that the invention is not limited to the embodiment disclosed. Rather, the invention is broadly applicable to many arithmetical processor or calculation units, and to applications wherein it is desired to evaluate lesser bit positions of the sum of two words, without incurring the time or area penalties associated with forming such a sum. As such, it will find ready use in diverse floating point units, dedicated arithmetical processors, and computational devices.

The invention being thus disclosed and described, variations and modifications will occur to those skilled in the art, and such variations and modifications are considered to be within the scope of the invention as set forth in the claims appended hereto.

What is claimed is:

1. A device for controlling a rounding off unit in a computer that performs an arithmetic operation on a pair of n-bit operands A, B to produce an n-bit output, operand A having bit components designated, in order from most to least significant, $A_{n-1} A_{n-2} \ldots A_i \ldots A_o$, and operand B having bit components $B_{n-1} B_{n-2} \ldots B_i \ldots B_o$, the computer processing an m-bit intermediate result C, where $m \leq n$, by providing carry information from said intermediate result C to the rounding off unit for rounding off an n-bit word to produce said output, the device being characterized by a first array of logic gates for processing ordered bit components $A_i$, $B_i$ of said operands in two successive time cycles to produce an m-bit conditional sum word, and a second array of logic gates for simultaneously receiving all bits of the conditional sum word and producing a single output bit corresponding to a logical OR of said bits of the conditional sum word, wherein the first array is an array of m identical cells $F_j (j=m, m-1, \ldots 1)$ comprising first and second ranks of logic gates, the first rank of logic gates comprising in each cell $F_j$ an EXCLUSIVE OR gate connected to receive input bits $A_j$ and $B_j$, and also comprising an OR gate connected to receive input bits $A_{j-1}$, $B_{j-1}$, and the second rank of logic gates comprising an EXCLUSIVE OR gate in each cell $F_j$ receiving as its inputs outputs of the EXCLUSIVE OR gate and the OR gate of the first rank of said cell $F_j$ and producing an output bit $S_j$, so that altogether the first array produces an m-bit conditional sum output word S having bit components equal to the output bits $S_j (j=m, m-1, \ldots 1)$, and wherein the second array is a circuit that ORs the m bits $S_j$ to produce a single output bit, the single output bit being provided as a control signal to the rounding off unit to control rounding of the n-bit output word.

2. The device of claim 1, wherein the computer includes a floating point unit, and said first array receives as inputs m least significant bits of each of A and B.

3. The device of claim 2, wherein the floating point unit is a unit selected from among an adder, a multiplier, and a divider.

4. The device of claim 3, wherein $m=n$.

5. A method for controlling a rounding off unit in a computer that performs an arithmetic operation on a pair of n-bit operands A, B to produce an n-bit output, operand A having bit components designated, in order from most to least significant, $A_{n-1} A_{n-2} \ldots A_i \ldots A_o$, and operand B having bit components $B_{n-1} B_{n-2} \ldots B_i \ldots B_o$, the computer processing an m-bit intermediate result C, where $m \leq n$, by providing carry information from said intermediate result C to the rounding off unit for rounding off an n-bit word to produce said output, the method being characterized by processing in a first array of logic gates ordered bit components $A_i$, $B_i$ of said operands in two successive time cycles to produce an m-bit conditional sum word, and providing a second array of logic gates for simultaneously receiving all m bits of the conditional sum word and producing a single output bit corresponding to a logical OR of said m bits of the conditional sum word, wherein the step of processing processes said ordered bit components in an array of m identical cells $F_j (j=m, m-1, \ldots 1)$ comprising first and second ranks of logic gates, the first rank of logic gates comprising in each cell $F_j$ an EXCLUSIVE OR gate connected to receive input bits $A_j$ and $B_j$, and also comprising an OR gate connected to receive input bits $A_{j-1}$, $B_{j-1}$, and the second rank of logic gates comprising an EXCLUSIVE OR gate in each cell $F_j$ receiving as its inputs outputs of the EXCLUSIVE OR gate and the OR gate of the first rank of said cell $F_j$ and producing an output bit $S_j$, thereby generating an m-bit conditional sum output word S having bit components equal to the output bits $S_j (j=m, m-1, \ldots 1)$, and logically ORing the m bits $S_j$ in said second array of logic gates to produce a signal output bit, and providing the single output bit as a control signal to the rounding off unit to control rounding of the n-bit output word.

6. The method of claim 5, wherein the computer includes a floating point unit, and said step of processing in the first array includes providing as inputs to said array m least significant bits of each of A and B.

7. The method of claim 6, wherein the floating point unit is a unit selected from among an adder, a multiplier, and a divider, and said single output bit is provided to control rounding of an output thereof.

8. The method of claim 7, wherein $m=n$ and the step of processing processes n least significant bits of an output.

* * * * *